United States Patent
Betts

Patent Number: 6,101,223
Date of Patent: Aug. 8, 2000

[54] SYSTEM AND METHOD FOR OPTIMIZING THE UNCODED MODULATION OF CIRCULAR CONSTELLATIONS USING CIRCULAR PRECODING AND NONLINEAR ENCODING

[75] Inventor: William L. Betts, St. Petersburg, Fla.

[73] Assignee: Paradyne Corporation, Largo, Fla.

[21] Appl. No.: 08/978,757

[22] Filed: Nov. 26, 1997

Related U.S. Application Data

[60] Provisional application No. 60/037,191, Mar. 6, 1997.

[51] Int. Cl.[7] .................................................. H04B 1/38
[52] U.S. Cl. ......................... 375/261; 375/261; 375/298
[58] Field of Search ..................... 375/223, 222, 375/261, 298; 329/304, 305; 332/103

[56] References Cited

U.S. PATENT DOCUMENTS

| | | | |
|---|---|---|---|
| 4,669,090 | 5/1987 | Betts et al. | 375/8 |
| 5,103,227 | 4/1992 | Betts | 341/61 |
| 5,233,629 | 8/1993 | Paik et al. | 375/39 |
| 5,249,200 | 9/1993 | Chen et al. | 375/58 |
| 5,265,127 | 11/1993 | Betts et al. | 375/39 |
| 5,388,124 | 2/1995 | Laroia et al. | 375/17 |
| 5,446,758 | 8/1995 | Eyuboglu | 375/259 |
| 5,621,761 | 4/1997 | Heegard | 375/265 |
| 5,809,033 | 9/1998 | Turner et al. | 370/522 |
| 5,852,630 | 12/1998 | Langberg et al. | 375/219 |

*Primary Examiner*—Stephen Chin
*Assistant Examiner*—Dac V. Ha
*Attorney, Agent, or Firm*—Thomas, Kayden, Horstemeyer & Risley, L.L.P.

[57] ABSTRACT

A system and method for optimizing the uncoded transmission and reception, or modulation and demodulation, of data using circular constellations by using circular preceding and nonlinear encoding. This system allows increased data rate by improving channel efficiency and signal-to-noise ratio.

52 Claims, 5 Drawing Sheets

SYSTEM AND METHOD FOR OPTIMIZING THE UNCODED MODULATION OF CIRCULAR CONSTELLATIONS USING CIRCULAR PRECODING AND NONLINEAR ENCODING

CROSS REFERENCE TO RELATED APPLICATION

This document claims priority to and the benefit of the filing date of copending and commonly assigned provisional application entitled CIRCULAR PRECODING AND NONLINEAR ENCODING, assigned Ser. No. 60/037,191, and filed Mar. 6, 1997 and is hereby incorporated by reference.

FIELD OF THE INVENTION

The present invention relates generally to data communications, and more particularly, to a system and method for optimizing the uncoded transmission and reception, or modulation and demodulation, of data using circular constellations by using circular precoding and nonlinear encoding.

BACKGROUND OF THE INVENTION

The field of data communications typically uses a modem to convey information from one location to another. Digital Subscriber Line (DSL) technology now enables modems to communicate large amounts of data. Modems communicate by modulating a baseband signal carrying digital data, converting the modulated digital data signal to an analog signal, and transmitting the analog signal over a conventional copper wire pair using techniques that are known in the art. These known techniques include mapping the information to be transmitted into a square or circular multidimensional signal space constellation. In some instances, a onedimensional signal space constellation can be employed, such as in the case of pulse amplitude modulation (PAM). The constellation can include both analog and digital information or only digital information.

In the above mentioned communications system, typically both digital data and an analog signal are to be transmitted. The data signal to be transmitted is represented by a sequence of data symbols, where each data symbol is associated with a particular N-dimensional signal point value taken from a signal space. Similarly, the analog signal, which for example can be represented by a voice signal, is processed so that it is mapped into the N-dimensional signal space to provide a voice signal point. This voice signal point defines the magnitude and angle of a voice signal vector about the origin of the signal space. The data symbol and the voice vector are then added together to select a resultant N-dimensional signal point. These N-dimensional signal points are grouped into signal space constellations and then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

Because square signal space constellations have a higher peak factor, square constellations typically require more power to transmit a given amount of information than circular constellations. Square constellations also have a greater susceptibility to harmonic distortion. For example, in a 256 point two dimensional circular constellation, the constellation point, or symbol, with the highest power has the x, y coordinates 17, 5 with a peak power of $17^2+5^2=314$, whereas the highest power point in a square constellation has the x, y coordinates 15, 15 with a peak power of $15^2+15^2=450$. As can be seen, the peak power of a circular constellation is 1.6 dB lower than that of a square constellation.

The modulation technique that is used to transmit the aforementioned signals can be either coded or uncoded. Coded modulation entails encoding the data signal prior to transmission and then decoding the received coded data signal in a receiver. Coded modulation as known in the art entails various forward error correction (FEC) techniques, such as block coding, convolutional coding and trellis coding. The FEC code acts on a discrete data channel whereby an encoder maps the source data to q-ary code symbols which are modulated and transmitted. During transmission, this signal can be corrupted, causing errors to arise in the demodulated symbol sequence. An FEC decoder attempts to correct these errors and restore the original source data. Trellis coding is presently considered state of the art for coded modulation. Coded modulation, however, consumes power and available bandwidth by requiring additional computational cycles by the system processor to provide the forward error correction code.

Prior art preceding used with coded modulation, such as Tomlinson precoding, allows the transmitter to adapt to the channel frequency response. The equivalent discrete time channel response is measured at the receiver and sent back to the transmitter where a precoder adapts the transmit signal to the measured channel frequency response. The precoder compensates for the intersymbol interference (ISI) introduced by the channel allowing the receiver to detect the data by a simple threshold operation. Prior art precoding is accomplished by placing the modulo operation of the precoder at the output of the precoder.

Nonlinear encoding projects the signal constellation points on a non-linear surface to increase the margin or distance between the signal points on the perimeter of the signal constellation, thus reducing distortion on the perimeter of the constellation. Non-linear encoding is disclosed in commonly assigned U.S. Pat. No. 5,265,127 to Betts et al. titled "NON-LINEAR ENCODER AND DECODER FOR INFORMATION TRANSMISSION THROUGH NONLINEAR CHANNELS" dated Nov. 23, 1993.

Previously, circular constellations have been implemented using coded modulation in which trellis coding is employed to reduce the error rate as in V.34, and square constellations have been implemented using carierless amplitude/phase (CAP) modulation, which uses Tomlinson preceding to reduce the error rate. Transmitting a square constellation increases the peak factor of the transmitted signal, thus causing an increase in power consumption and harmonic distortion. Therefore, it would be beneficial to develop a way in which to transmit a circular signal space constellation in an uncoded modulation environment to maximize processor resources and improve efficiency. Furthermore, a need exists in the industry for an improved method of transmitting and receiving, using uncoded modulation, a circular signal space constellation.

SUMMARY OF THE INVENTION

Because of the processor resource savings realized by omitting the trellis coding steps, which consume processor cycles, uncoded modulation enables higher data rates, thus making more processor cycles available for the transmission of data. The present invention provides an improved system and method for uncoded modulation in a communication device using circular constellations by adding the additional benefits of preceding and nonlinear encoding.

The concepts and features of the present invention incorporate some of the concepts and features of commonly assigned, U.S. Pat. No. 6,026,120 to Betts, dated Feb. 15, 2000, entitled SYSTEM AND METHOD FOR USING CIRCULAR CONSTELLATIONS WITH UNCODED MODULATION, incorporated herein by reference.

In a preferred embodiment of the present invention, an N bit word is supplied from an ISA bus to a register which separates the N bit word into N−2 most significant bits (msb's) and 2 least significant bits (lsb's). An International Standards Architecture (ISA) bus is an industry standard which eliminates the need for signal interfaces and is well known in the art. Based upon the data rate capacity of the channel, groups of 16 or 32 bit words are converted into frames of N bit words where N is determined by the data rate capacity of the channel. In order to allow the transmission of fractional bit rates as is known in the art of data communications, the register can optionally include a modulus converter or other means, such as constellation switching or shell mapping, to enable the transmission of fractional bit rates. The N−2 msb's are next supplied to a mapper, which maps the signal into a multidimensional circular signal space constellation. While the foregoing is described in the context of a multi-dimensional signal space constellation, the present invention is equally applicable to one dimensional signal space constellations, such as that employed with pulse amplitude modulation (PAM).

Optionally, an N bit word is supplied first to a scrambler. The scrambler performs an operation on the N bit word that results in a scrambled N bit word.

Next, the signal is operated upon by a phase encoder which is designed to develop a rotation vector using the 2 lsb's supplied by the register. This rotation vector is combined in a rotator with the mapped N−2 bit vector representing the N−2 msb's to form the circular signal space constellation of the present invention and creates a phase rotated signal. Optionally, the phase encoder includes a differential encoder which encodes the 2 lsb's of the N bit word to develop 2 differential bits. These 2 differential bits are added to the 2 lsb phase bits supplied from the register and become part of the rotation vector.

This phase rotated signal is then supplied to the precoder of the present invention. The precoder processes the phase rotated signal thus allowing the transmitter to adapt to the channel frequency response. The equivalent discrete time channel response is measured at the receiver and sent back to the transmitter where the precoder adapts the transmit signal to the measured channel frequency response. The precoder compensates for the intersymbol interference (ISI) introduced by the channel allowing the receiver to detect the data by a simple threshold operation. After preceding, the precoded phase rotated signal is multiplied by a function of the data rate of the modulator, resulting in a precoded scaled phase rotated signal. The precoded scaled phase rotated signal is then supplied to a nonlinear encoder, such as that disclosed in commonly assigned U.S. Pat. No. 5,265,127 to Betts et al. titled "NON-LINEAR ENCODER AND DECODER FOR INFORMATION TRANSMISSION THROUGH NON-LINEAR CHANNELS" dated Nov. 23, 1993.

The phase rotated signal is then modulated using either carrierless amplitude/phase (CAP) modulation or any uncoded modulation scheme such as uncoded quadrature amplitude modulation (QAM), or pulse amplitude modulation (PAM), and then transmitted over a communication channel comprising a conventional wire pair. In the case of PAM modulation, the signal space is onedimensional instead of multidimensional as in QAM, however, the concepts of the present invention are equally applicable thereto.

At a receiver, the transmitted scaled precoded phase rotated signal is received, demodulated and equalized in accordance with techniques that are known in the art of modem communications. The received signal is then operated on by a nonlinear decoder which performs the inverse operation of the nonlinear encoder. The signal is then processed by a noise whitening filter, which performs an inverse of the precoder operation in the transmitter. The received scaled precoded phase rotated signal is then divided by a 1/scale function of the data rate of the modulator which results in a normalized phase rotated signal. Next, a slicer slices the full signal space constellation to obtain the ideal values of the X and Y components of the received signal. The output of the slicer is then scaled up and supplied to an adder, which subtracts the input of the 1/scale function in order to develop the error signal used to update the coefficients of the equalizer as is known in the art. The signal is then passed to a precoder reconstruction operation in which a FIR filter and a modulo operation process the signal to remove the modulo operation applied in the transmitter. Next, the 2 phase bits are phase decoded, and optionally, differentially decoded in order to recover the 2 least significant bits of the N bit word. The phase rotated signal is then derotated and the multidimensional signal space constellation is then sliced, as is known in the art, in order to recover the mapped N−2 msb's. Lastly, if scrambled, the scrambled N bit word is descrambled in order to output an unscrambled N bit word.

Various modulation techniques may benefit from the concepts and features of the present invention. For example, the present invention will function equally well using carrierless amplitude/phase (CAP) modulation, or any uncoded modulation such as uncoded QAM or uncoded PAM.

The invention has numerous advantages, a few of which are delineated hereafter, as merely examples.

An advantage of the present invention is that the use of circular constellations and nonlinear encoding in an uncoded modulation environment improves the signal-to-noise ratio (SNR) by approximately 0.4 dB. The SNR improvement from preceding depends on the channel and can be several dB.

Another advantage of the present invention is that multi-dimensional operations, such as interleaving, may be performed prior to the precoder in the transmitter with no loss of performance. Such operations when used with a decision feedback equalizer (DFE) in the receiver may otherwise suffer performance loss because early decisions may not be available for the DFE until the full multi-dimensional symbol is received.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings.

The drawings are not necessarily to scale, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in the respective modem. However, the foregoing software can be stored on any computer-readable medium for use by or in connection with any suitable computer-related system or method. In the context of this document, a computer-readable medium is an electronic, magnetic, optical, or other physical device or means that can contain or store a computer program for use by or in connection with a computer-related system or method.

Figure 1:
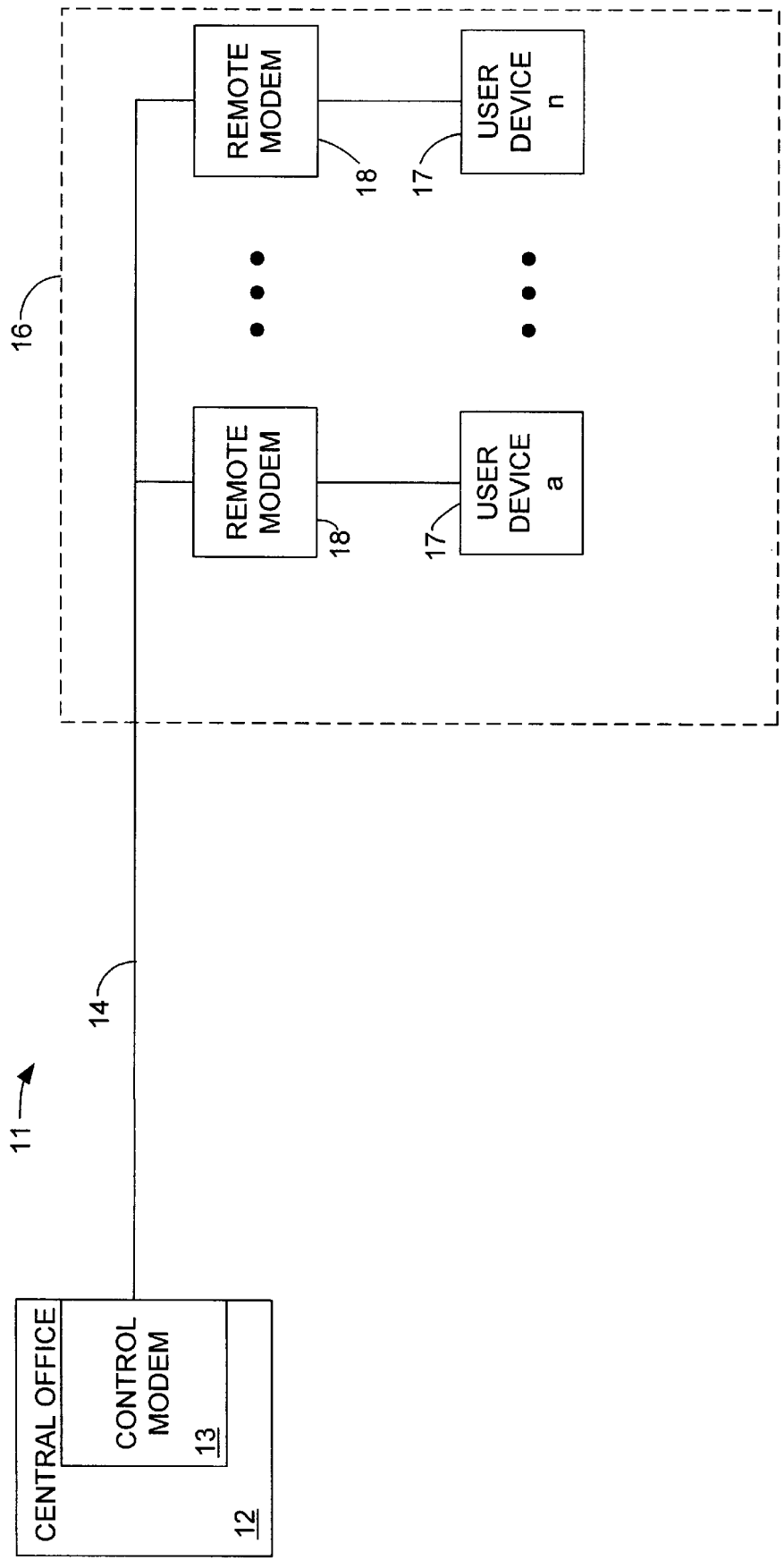
FIG. 1 is a schematic view of a multipoint communications channel including modems employing the concepts and features of the present invention.

Referring now to FIG. 1, shown is a view illustrating a multipoint communications environment 11 in which modems 18 and 13 employing the concepts and features of the present invention are used. Remote location 16 is connected to central office location 12 and control modem 13 via communications channel 14. Channel 14 is typically the copper wire pair that runs between a telephone company central office and a remote residential or business location. Remote location 16 may contain a plurality of modems 18 connecting a plurality of user devices 17 to channel 14. Remote location 16 can be a residential or a business location. By using modems 18 and 13 employing the concepts and features of the present invention, it is possible to transmit and receive data using circular constellations with uncoded modulation, while taking advantage of the improved signal-to-noise ratio made possible with precoding and nonlinear encoding. While the following preferred embodiment is described with reference to modem 18, the concepts and features of the present invention are equally applicable to control modem 13.

Figure 2:
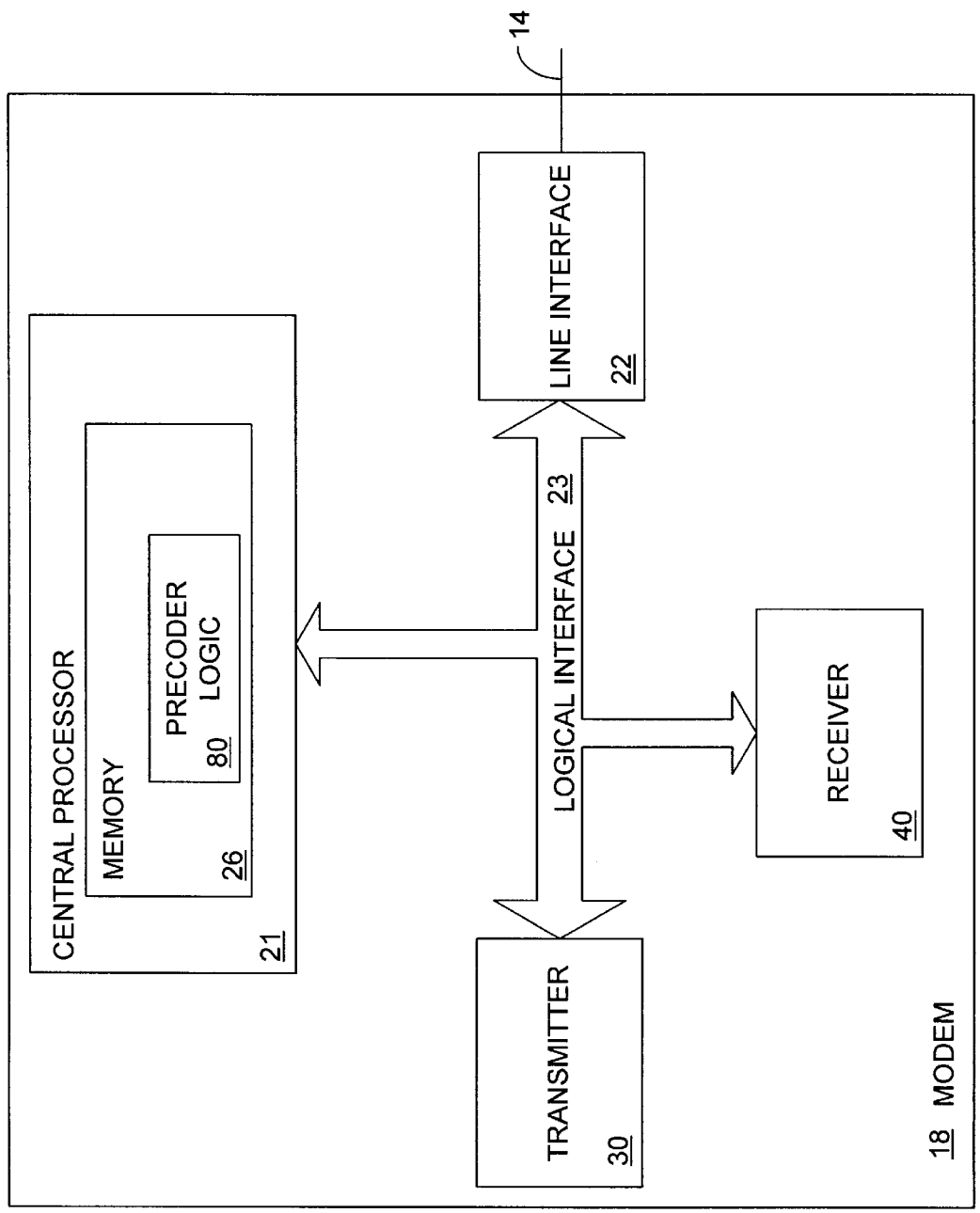
FIG. 2 is a schematic view illustrating a modem of FIG. 1 employing the concepts of the present invention.

Now referring to FIG. 2, shown is a schematic view illustrating a modem 18 of FIG. 1 employing the concepts of the present invention. Modem 18 contains conventional components as is known in the art of data communications. Central processor 21 controls the operation of the modem's transmitter 30 and receiver 40 through logical interface 23. Central processor 21 also contains memory 26 in which precoder logic 80 for the present invention may reside. The components of the modem connect to communications channel 14 through line interface 22. By employing the concept of transmitting a circular constellation in an uncoded modulation scheme with precoding and nonlinear encoding, a signal-to-noise ratio improvement in excess of approximately 0.4 dB can be realized over transmitting without precoding and nonlinear encoding.

Figure 3:
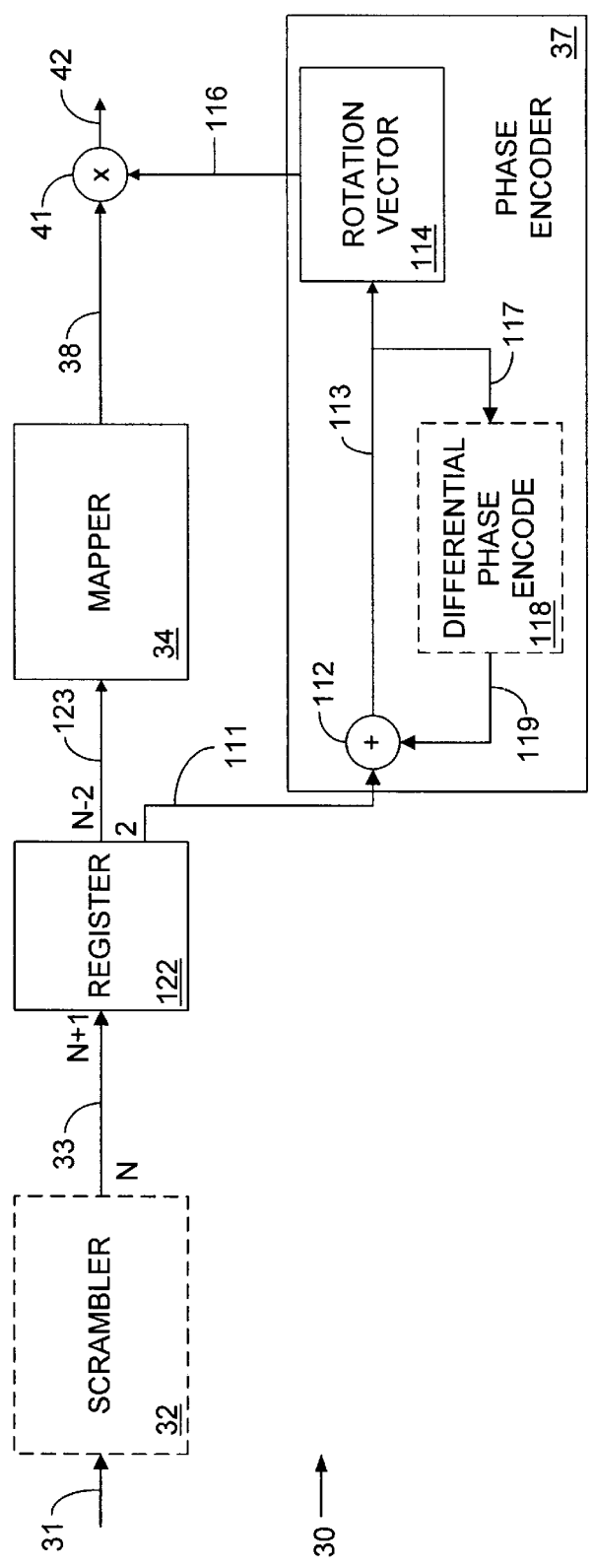
FIG. 3 is a schematic view of the transmitter section of the modem of FIG. 2.
Figure 3:
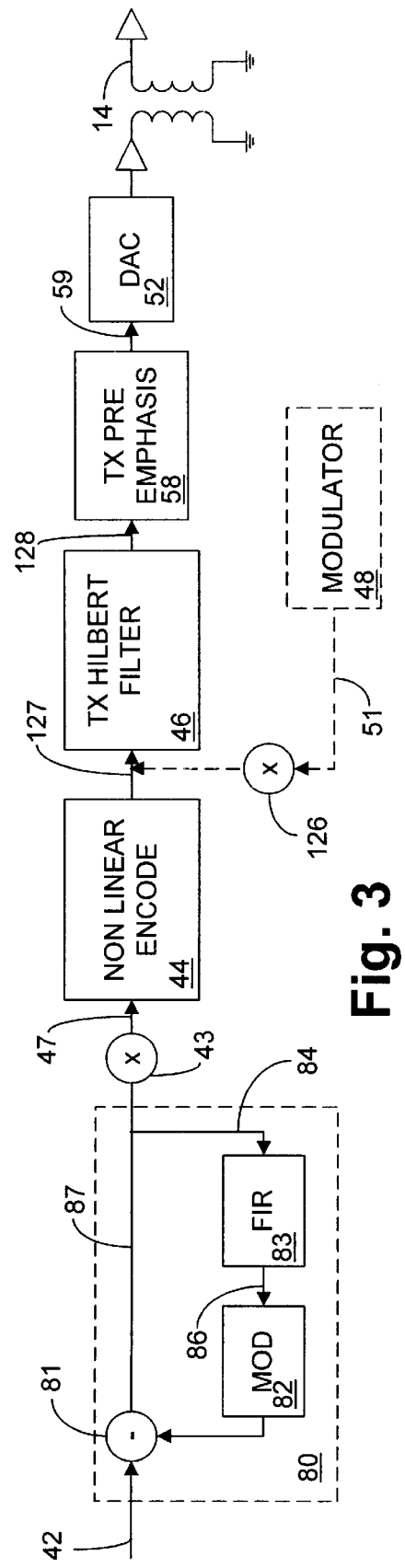

With reference to FIG. 3, shown is a preferred embodiment of a transmitter 30 of modem 18 employing the concepts of the present invention. An ISA bus, a standard computer bus, which eliminates the need for interfaces, supplies data, in the form of a data word that can be either 16 or 32 bits for the preferred embodiment, on line 33 to register 122. This data word is transformed into an N bit word by counting bits and shifting to arrive at a smaller number of bits In this example, an N bit data word is segmented into N−2 most significant bits (msb's) and 2 least significant bits (lsb's). By employing a circular constellation, N can be any number. Optionally, in order to allow the transmission of fractional bit rates as is known in the art of data communications, register 122 can include a modulus converter or other means such as constellation switching or shell mapping. Modulus conversion is a well known technique in the art of communications for allowing the transmission of fractional bit rates, and is described in U.S. Pat. No. 5,103,227 to Betts, entitled MODULUS CONVERTER FOR FRACTIONAL RATE ENCODING, dated Apr. 7, 1992. Constellation switching allows the transmission of fractional bit rates by, for example, first transmitting 6 bits in one symbol and 7 bits in the next symbol if it is desired to transmit 6½ bits. For 6¾ bits one would transmit 7 bits per symbol for three symbol cycles and transmit 6 bits per symbol for the fourth symbol cycle. Shell mapping blocks the data into frames and a shell mapping algorithm, such as that described in the V.34 specification, is used to map the frames of data into a constellation of a certain size.

Optionally, the N bit word is first input on line 31 to scrambler 32. Scrambler 32 can be either a self synchronized scrambler or a preset free running scrambler as is known in the art. Depending on the application, the preset scrambler may have some advantage, as in the case of using Reed-Solomon coding. If scrambler 32 is employed, a scrambled N bit word is output on line 33.

The resulting N−2 bit word on line 123 is supplied to mapper 34, which maps the N−2 bit word into a multidimensional circular signal space constellation, resulting in mapped N−2 msb's, represented by a 2-dimensional vector, supplied on line 38 to rotator 41.

Next, the 2 lsb's on line 111 are operated upon by phase encoder 37. Phase encoder 37 is designed to develop a rotation vector 114 using the 2 lsb's supplied by the register. This rotation vector is output on line 116 and combined in rotator 41 with the mapped N−2 bit word on line 38 to form a phase rotated signal, thus creating a symmetric circular signal space constellation. Optionally, phase encoder 37 includes differential phase encoder 118 which encodes the 2 lsb's of the N bit word to develop 2 differential bits. These 2 differential bits are output on line 119 and combined with the 2 lsb's from register 122 in adder 112 and become part of the rotation vector 114.

Rotator 41 performs vector multiplication on the rotation vector on line 116 and the mapped N−2 msb's on line 38 to cause a phase rotation, thus producing the final quadrant symmetric circular signal space constellation on line 42.

The circular constellation on line 42 is then supplied to precoder 80 of the present invention. Precoder 80 comprises a finite impulse response (FIR) filter 83 in feedback loop 84. For the preferred embodiment a FIR filter is illustrated, however any filter can be employed to practice the concepts of the present invention. FIR filter 83 is followed by modulo operation 82. Modulo operation 82 operates on the signal on line 86 whereby if the voltage of the signal on line 86 is greater than a preset value, twice that value is subtracted from the signal until the signal is less than or equal to the preset value. Or, if a value more negative than a negative preset value, twice that value is added to the signal until the signal is greater than or equal to the negative preset value. The modulo modified signal is then supplied to subtractor 81 where it is subtracted from the signal on line 42 for input to FIR filter 83. After processing by precoder 80 the circular constellation is supplied on line 87 to scaler 43.

Scaler 43 multiplies the circular constellation by a scale function of the data rate and supplies a complex number comprising X and Y values on line 47 to nonlinear encoder 44. The scale function allows a single table to be used to implement the mapper at all data rates. Nonlinear encoder 44 encodes the signal as described in commonly assigned U.S. Pat. No. 5,265,127 to Betts et al. titled "NON-LINEAR ENCODER AND DECODER FOR INFORMATION TRANSMISSION THROUGH NON-LINEAR CHANNELS" dated Nov. 23, 1993.

The encoded signal output from nonlinear encoder 44 is next supplied on line 127 to TX Hilbert filter 46. TX Hilbert filter 46 operates on the signal to provide a carrierless amplitude/phase modulation (CAP) modulated signal on line 128 to transmit preemphasis filter 58. In an alternative embodiment of the present invention, the scaled circular constellation on line 127 is modulated using uncoded modulator 48, using a technique such as uncoded quadrature amplitude modulation (QAM) as is known in the art. Uncoded modulator 48 provides the sine and cosine components of a carrier frequency, or the X and Y values of the carrier frequency as is known in the art, on line 51 to multiplier 126. Multiplier 126 combines the X and Y components with the output of nonlinear encoder 44 for input to TX Hilbert filter 46, which provides a bandpass output at a certain frequency range. The concepts and features of the present invention as claimed can be practiced using either CAP modulation or an uncoded modulation technique such as uncoded QAM or uncoded PAM.

The operation of the communications system disclosed thus far, i.e., up to TX Hilbert filter 46, occurs at the symbol rate of the modem, with the symbol rate equal to the bandwidth of the modem, thus allowing the use of reduced cost components. The output of TX Hilbert filter 46, transmit preemphasis filter 58 and DAC 52 are computed at the sample rate, which is typically three times that of the symbol rate.

The modulated signal on line 128 is supplied to transmit pre emphasis filter 58. As is known in the art, transmit preemphasis filter 58 adds preemphasis to the signal, and is typically a FIR filter as is known in the art. The preemphasized transmit signal is next supplied on line 59 to digital to analog converter (DAC) 52 for conversion to an analog signal that can be transmitted conventionally over communication channel 14 as is known in the art. Optionally, preemphasis filter 58 can reside after the DAC to provide preemphasis in the analog domain.

Figure 4A:
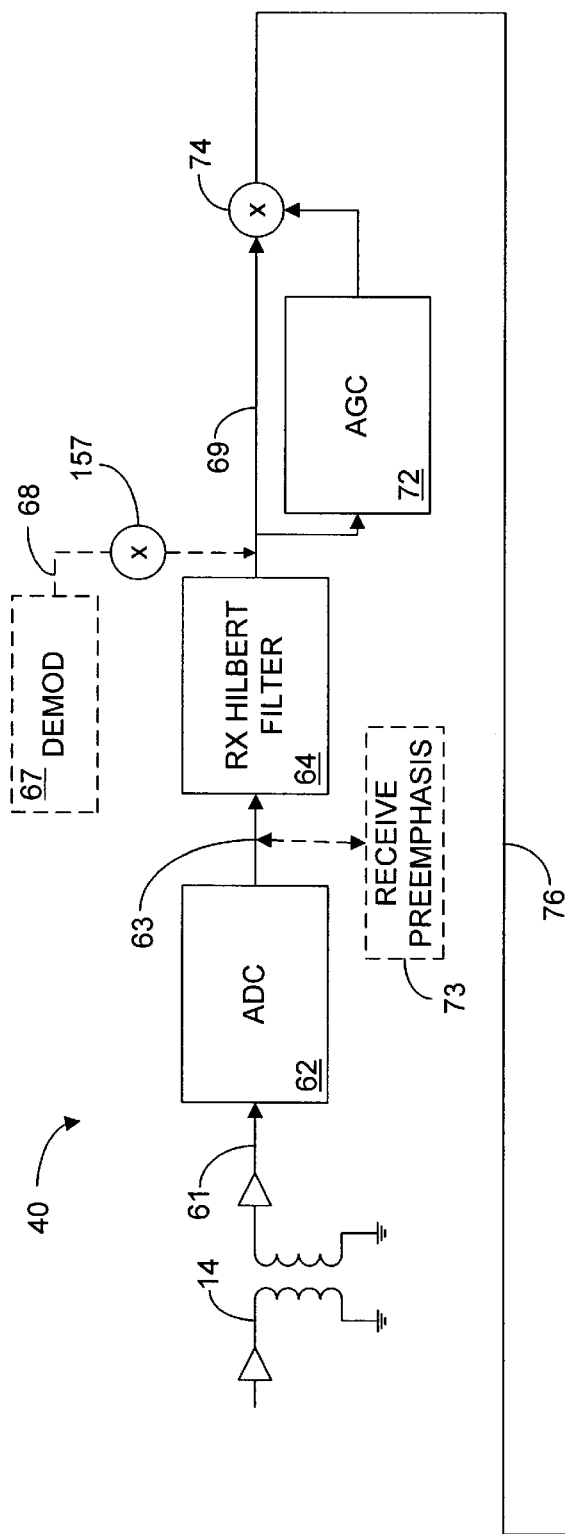
FIG. 4A is a schematic view of a portion of the receiver section of the modem of FIG. 2.
Figure 4A:
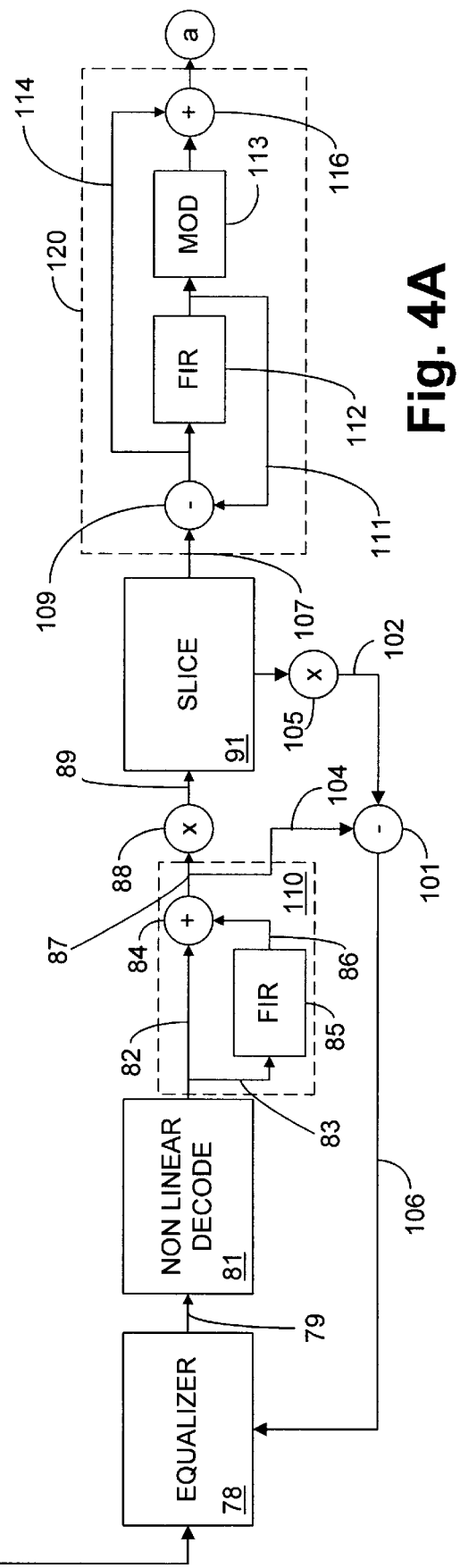

Now referring to FIG. 4A, shown is a schematic view of a portion of the receiver section 40 of the modem of FIG. 2. The received signal is input from communication channel 14 on line 61 to analog to digital converter (ADC) 62 for conversion to the digital domain as known in the art. The digital received signal is supplied on line 63 to RX Hilbert filter 64. The filtered signal is output from RX Hilbert filter 64 on line 69. In the case of uncoded QAM modulation, demodulator 67 provides the sine and cosine components of the carrier frequency on line 68 to multiplier 157 for combination with the output of RX Hilbert filter 64. The demodulated output is provided on line 69 to automatic gain control (AGC) circuit 72. AGC circuit 72 multiplies the demodulated received signal by gain factor 74. The AGC compensated signal is then supplied on line 76 to equalizer 78. Equalizer 78 is a known in the art finite impulse response (FIR) filter with adaptive coefficients and could take on other forms such as a lattice equalizer.

Optionally, receive preemphasis filter 73 may be employed to further enhance the communication signal. This is particularly advantageous when an echo canceler is used where a replica of the transmit echo is subtracted from the input to the RX Hilbert filter 64 at the output of the receive preemphasis filter 73.

As is known in the art, the coefficients of equalizer 78 are adaptively updated by subtracting the input of scaler 88 from the ideal reference signal output of slicer 91, which is upscaled by scaler 105 and output on line 102. The output of subtractor 101 is the error signal that is supplied to equalizer 78 on line 106 and used to update the filter coefficients of equalizer 78.

The equalized signal is supplied on line 79 to nonlinear decoder 81 which performs the inverse operation of nonlinear encoder 44. The output of nonlinear decoder 81 is supplied on line 82 to noise whitening filter 110. Noise whitening filter 110 is a part of the receiver precoder and includes FIR filter 85 and adder 84. Noise whitening filter 110 performs the inverse operation of precoder 80 in order to provide the correct channel response to scaler 88. The output of nonlinear decoder 81 is supplied to FIR filter 85, which replicates the operation of FIR filter 83 in transmitter 30 of FIG. 3. The output of FIR filter 85 is added to the output of nonlinear decoder 81 by adder 84 and supplied on line 87 to scaler 88 which operates on the received signal with a 1/scale factor. The 1/scale factor is a function of the data rate depending on the number of points in the constellation. The output of scaler 88 is the normalized X and Y components representing the values of the symbols in the circular signal space constellation.

The normalized output of scaler 88 is supplied to slicer 91, which performs the inverse operation of mapper 34. Slicer 91 generates the nearest ideal reference vector $X_R$, $Y_R$ to the received X, Y vector. Because the signal is normalized, one slicer can be used for all data rates.

The input of scaler 88 is also supplied to adder 101 along with the upscaled output of slicer 91 through scaler 105. Scaler 105 upscales the output of slicer 91 for input to adder 101. Adder 101 subtracts the input to the 1/scale factor from the upscaled output of slicer 91 to obtain an error signal on line 106 to update FIR filter tap coefficients of equalizer 78. Improved precision is achieved using the input of scaler 88 and the upscaled references on line 102.

The output of slicer 91 is then supplied on line 107 to precoder reconstruction device 120. Precoder reconstruction device 120 removes the modulo operation applied in transmitter 30 of FIG. 3. The output of slicer 91 represents ideal reference signals of the X and Y values of the signal space constellation. These ideal values are input to subtractor 109, which subtracts the output of FIR filter 112. The output of subtractor 109 is fed into FIR filter 112 and adder 116. The output of FIR filter 112 feeds subtractor 109 and modulo operation 113. Modulo operation 113 is then added to the input to FIR filter 112 by adder 116 resulting in the removal of the modulo operation applied in transmitter 30 of FIG. 3.

Figure 4B:
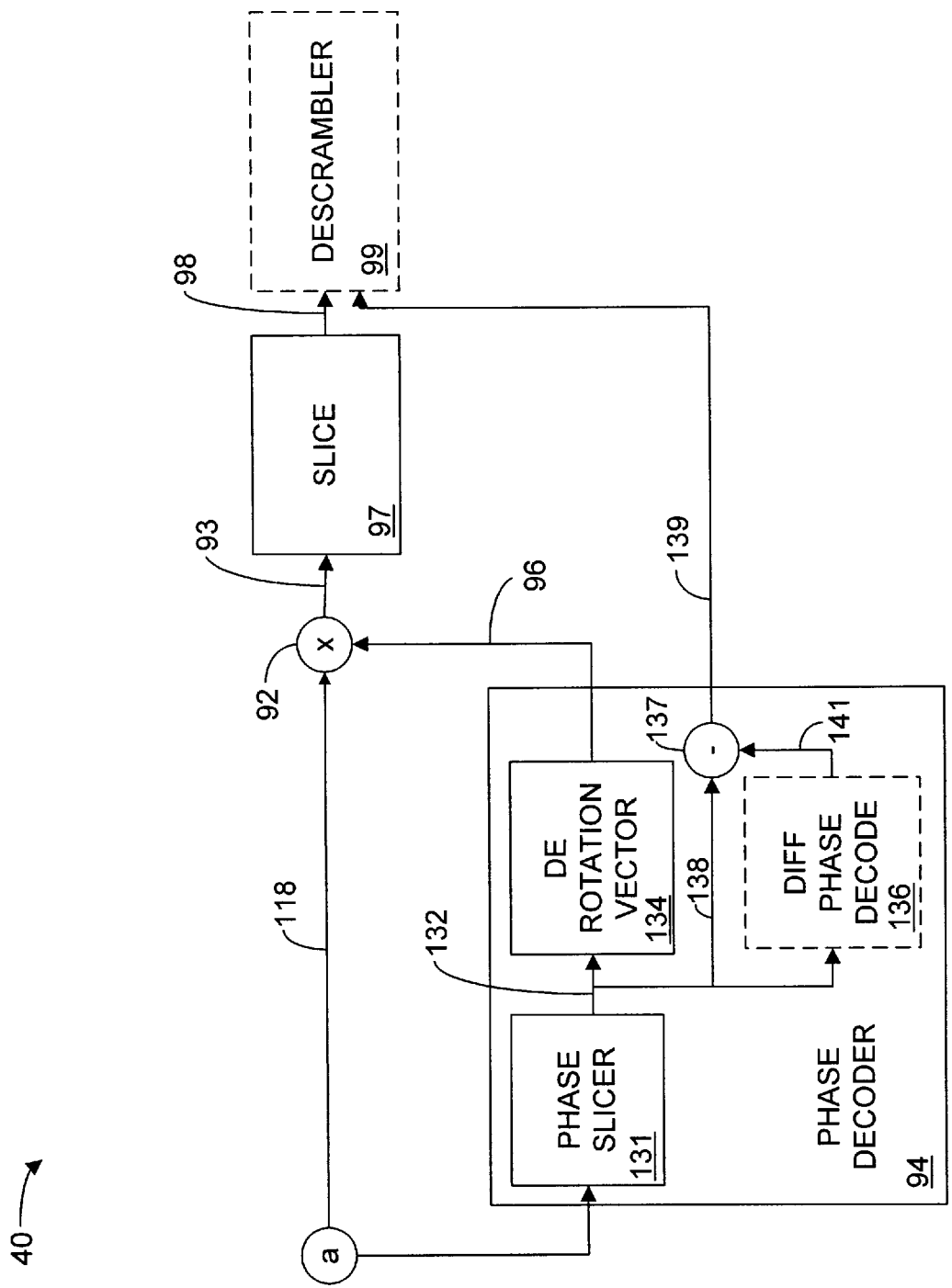
FIG. 4B is a schematic view of the balance of the receiver section of the modem of FIG. 2.

With reference now to FIG. 4B, phase decoder 94 decodes the 2 lsb's of the received signal by analyzing the output of precoder reconstructon device 120 to determine which phase rotation was transmitted.

Phase slicer 131 slices the circular signal space constellation to separate the 2 lsb's for input on line 132 to derotation vector operator 134. Derotation vector operator 134 outputs a derotation vector on line 96 which is combined with the output of precoder reconstruction device 120 on line 118 in rotator 92. Rotator 92 multiplies the X and Y output of the table is the N−2 msb data that was originally transmitted which is then combined with the decoded 2 least significant bits from phase decoder 94 to form the decoded N bit word.

TABLE 1

```
                    /*  POWER INDEXED 4-D SUBSET    */
const int eye_slicer[576] = {
   0,   0,   0,   0,   0,   0,   0,   0, 441, 420, 408, 396, 394, 400, 414, 427,   0,   0,   0,   0,   0,   0,   0,   0,
   0,   0,   0,   0,   0,   0, 429, 398, 375, 349, 339, 329, 326, 335, 347, 359, 386, 416, 451,   0,   0,   0,   0,   0,
   0,   0,   0,   0,   0, 412, 371, 340, 314, 290, 279, 269, 265, 273, 281, 302, 322, 353, 390, 430,   0,   0,   0,   0,
   0,   0,   0,   0, 401, 357, 318, 282, 257, 236, 224, 216, 212, 218, 228, 247, 270, 298, 337, 378, 424,   0,   0,   0,
   0,   0,   0, 406, 350, 308, 266, 234, 206, 185, 173, 164, 162, 170, 181, 197, 220, 253, 288, 327, 379, 431,   0,   0,
   0,   0, 421, 360, 310, 263, 226, 193, 165, 146, 133, 123, 121, 125, 137, 154, 179, 207, 242, 289, 338, 391, 452,   0,
   0, 447, 384, 324, 277, 229, 189, 156, 131, 110,  96,  87,  83,  92, 100, 117, 140, 172, 208, 254, 299, 354, 417,   0,
   0, 418, 355, 294, 243, 201, 160, 128,  98,  79,  64,  58,  54,  82,  71,  90, 112, 141, 180, 221, 271, 323, 387,   0,
   0, 392, 330, 274, 222, 177, 135, 102,  77,  55,  41,  35,  31,  37,  48,  65,  91, 118, 155, 198, 248, 303, 361, 428,
 448, 380, 316, 255, 203, 158, 119,  84,  60,  39,  24,  17,  15,  20,  30,  49,  72, 101, 138, 182, 230, 283, 348, 415,
 439, 367, 304, 244, 194, 148, 108,  75,  50,  28,  13,   6,   4,   8,  21,  38,  63,  93, 127, 171, 219, 275, 336, 402,
 432, 362, 296, 238, 186, 142, 103,  69,  43,  22,   9,   1,   0,   5,  16,  32,  56,  85, 122, 163, 213, 267, 328, 395,
 437, 365, 300, 240, 190, 144, 106,  73,  45,  25,  11,   3,   2,   7,  18,  36,  59,  88, 124, 166, 217, 272, 331, 397,
 445, 372, 307, 251, 199, 152, 113,  80,  52,  33,  19,  12,  10,  14,  26,  42,  66,  97, 134, 174, 225, 280, 341, 409,
   0, 388, 320, 261, 210, 167, 128,  94,  67,  47,  34,  27,  23,  29,  40,  57,  81, 111, 147, 187, 237, 291, 351, 422,
   0, 410, 343, 284, 232, 183, 149, 115,  89,  68,  53,  46,  44,  51,  61,  78,  99, 132, 168, 209, 258, 315, 378, 442,
   0, 433, 369, 311, 259, 214, 175, 139, 116,  95,  82,  74,  70,  76,  86, 104, 129, 157, 195, 235, 285, 342, 399,   0,
   0,   0, 403, 345, 292, 249, 205, 176, 150, 130, 114, 107, 105, 109, 120, 136, 161, 191, 227, 268, 319, 373, 434,   0,
   0,   0, 443, 382, 332, 287, 250, 215, 184, 169, 153, 145, 143, 151, 159, 178, 202, 231, 264, 308, 358, 413,   0,   0,
   0,   0,   0, 425, 377, 333, 293, 260, 233, 211, 200, 192, 188, 196, 204, 223, 245, 278, 312, 352, 404,   0,   0,   0,
   0,   0,   0,   0, 426, 383, 346, 313, 286, 262, 252, 241, 239, 246, 256, 276, 295, 325, 363, 407,   0,   0,   0,   0,
   0,   0,   0,   0,   0, 444, 405, 370, 344, 321, 309, 301, 297, 305, 317, 334, 356, 385, 423,   0,   0,   0,   0,   0,
   0,   0,   0,   0,   0,   0, 435, 411, 389, 374, 366, 364, 368, 381, 393, 419, 449,   0,   0,   0,   0,   0,   0,   0,
   0,   0,   0,   0,   0,   0,   0,   0,   0, 446, 438, 436, 440, 450,   0,   0,   0,   0,   0,   0,   0,   0,   0,   0
}
``` values from precoder reconstruction device 120 with the derotation vector from phase decoder 94 for input to slicer 97 on line 93. As in the transmitter, phase decoder 94 optionally includes differential decoder 136 to decode the 2 lsb's if they were differentially encoded in the transmitter.

Differential decoder 136 develops 2 differential bits on line 141 in order to recover the 2 lsb's of the N bit word. The 2 differential bits are subtracted in subtractor 137 from the output of phase slicer 131 on line 138 and input on line 139 to optional descrambler 99.

Differential decoder 136 eliminates the need for a trellis decoder, thus reducing processor cycles. In the absence of differential decoder 136, the 2 lsb's are passed through adder 137 on line 138 with nothing subtracted from them, essentially passing them directly to optional descrambler 99.

While uncoded modulation is more susceptible to errors (by approximately 3 dB) the larger bandwidth made available by the elimination of the trellis coder more than compensates for the 3 dB. For example, by doubling the bandwidth only ½ as many bits per symbol need be transmitted, thus N is really N/2 for transmitting the same data rate at double the bandwidth. Using N/2, less than half the number of points (order of 4) in the signal space constellation, i.e. removing 2 bits from N, the constellation is reduced by a factor of four, resulting in a 6 dB noise improvement. Reducing N by 1 is a 3 dB noise improvement. The improvement realized by increased bandwidth is 3N/2 dB.

Slicer 97 converts the complex vector X, Y into the original N−2 msb's. Slicer 97 performs a mathematical operation in that it masks each axis to slice the axis. Slicer 97 then multiplies one of the axes of the constellation by a scale factor, and then adds the other masked axis value to the result, thus forming an index used as an address into a table known as the eye_slicer table, as shown in Table 1. The If scrambled, the N−2 msb's on line 98 and the 2 lsb's on line 139 are now supplied to descrambler 99 to be operated on to provide a descrambled N bit word as is known in the art. Descrambler 99 can be either a self synchronized scrambler or a preset free running scrambler as is known in the art similar to scrambler 32 in transmitter 30.

It will be obvious to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

Therefore, the following is claimed:

1. A system for improving the quality of a transmitted signal in a half duplex transmission environment using uncoded modulation and a circular signal space constellation, comprising:

a precoder for adapting a transmit signal based upon a measured channel frequency response;

a scaler for multiplying said transmit signal by a function of a data rate of a transmitter, said transmitter using said uncoded modulation; and a nonlinear encoder for warping the signal points at a perimeter of said circular signal space constellation.

2. The system of claim 1, wherein said precoder further comprises:

a finite impulse response (FIR) filter for preceding said transmit signal;

a modulo operation for subtracting a voltage value from said precoded transmit signal resulting in a modulo operated signal; and a subtractor for subtracting said modulo operated signal from said transmit signal.

3. The system of claim 2, wherein said FIR filter and said modulo operation reside in a feedback loop.

4. The system of claim 1, wherein said nonlinear encoder is a unity operator, passing said signal points unchanged.

5. The system of claim 1, further comprising a modulus converter for allowing the transmission of fractional bit rates.

6. The system of claim 5, wherein said modulus converter comprises a shell mapper.

7. The system of claim 5, wherein said modulus converter comprises constellation switching.

8. A system for communications in a modem using uncoded modulation and circular constellations, comprising:
- a register configured to receive an N bit word and supply N−2 most significant bits (msb's) and 2 least significant bits (lsb's);
- a mapper configured to map said N−2 msb's into a signal space constellation, resulting in mapped N−2 msb's;
- a phase encoder designed to develop a rotation vector using said 2 lsb's;
- a rotator designed to rotate said mapped N−2 msb's with said rotation vector, resulting in a phase rotated signal;
- a precoder designed to precode said phase rotated signal;
- a scaler designed to multiply said precoded phase rotated signal by a function of the data rate, resulting in a precoded scaled phase rotated signal;
- a nonlinear encoder for encoding said precoded scaled phase rotated signal;
- a modulator for modulating said precoded scaled phase rotated signal;
- a transmitter for transmitting said precoded scaled phase rotated signal over a communication channel;
- a receiver for receiving said transmitted precoded scaled phase rotated signal;
- a demodulator for demodulating said received precoded scaled phase rotated signal;
- an equalizer;
- a nonlinear encoder;
- a noise whitening filter for removing said preceding;
- a 1/scaler to divide said precoded scaled phase rotated signal by a function of the data rate of said modulator, resulting in a precoded phase rotated signal;
- a slicer for developing ideal reference signals;
- a precoder reconstruction filter for removing a modulus operation from said precoded phase rotated signal resulting in said phase rotated signal;
- a phase decoder designed to develop a derotation vector;
- a rotator designed to derotate said phase rotated signal to recover said mapped N−2 msb's; and
- a slicer designed to recover said mapped N−2 msb's from said multidimensional signal space constellation.

9. The system of claim 8, wherein said modulation comprises carrierless amplitude/phase (CAP) modulation.

10. The system of claim 8, wherein said modulated signal comprises uncoded quadrature amplitude modulation (QAM).

11. The system of claim 8, wherein said modulated signal comprises uncoded pulse amplitude modulation (PAM).

12. The system of claim 8, wherein said nonlinear encoder is a unity operator, passing said signal points unchanged.

13. The system of claim 8, wherein said precoder further comprises:
- a finite impulse response (FIR) filter for preceding said transmit signal;
- a modulo operation for subtracting a voltage value from said precoded transmit signal resulting in a modulo operated signal; and
- a subtractor for subtracting said modulo operated signal from said transmit signal.

14. The system of claim 13, wherein said FIR filter and said modulo operation reside in a feedback loop.

15. A system for transmitting in a modem using uncoded modulation and circular constellations, comprising:
- a register configured to receive an N bit word and supply N−2 msb's and 2 lsb's;
- a mapper configured to map said N−2 msb's into a signal space constellation, resulting in mapped N−2 msb's;
- a phase encoder designed to develop a rotation vector using said 2 lsb's;
- a rotator designed to rotate said mapped N−2 msb's with said rotation vector, resulting in a phase rotated signal;
- a precoder designed to precode said phase rotated signal;
- a scaler designed to multiply said precoded phase rotated signal by a function of the data rate, resulting in a precoded scaled phase rotated signal;
- a nonlinear encoder for encoding said precoded scaled phase rotated signal;
- a modulator for modulating said precoded scaled phase rotated signal; and
- a transmitter for transmitting said precoded scaled phase rotated signal over a communication channel.

16. The system of claim 15, wherein said precoder further comprises:
- a finite impulse response (FIR) filter;
- a modulo operation; and
- a subtractor.

17. The system of claim 16, wherein said FIR filter and said modulo operation resides in a feedback loop.

18. The system of claim 15, wherein said modulation comprises carrierless amplitude/phase (CAP) modulation.

19. The system of claim 15, wherein said modulated signal comprises uncoded quadrature amplitude modulation (QAM).

20. The system of claim 15, wherein said modulated signal comprises uncoded pulse amplitude modulation (PAM).

21. The system of claim 15, wherein said nonlinear encoder is a unity operator, passing said signal points unchanged.

22. A system for receiving in a modem using uncoded modulation and circular constellations, comprising:
- a receiver for receiving a precoded scaled phase rotated signal;
- a demodulator for demodulating said precoded scaled phase rotated signal;
- an equalizer;
- a nonlinear encoder;
- a noise whitening filter for removing precoding from said precoded scaled phase rotated signal;
- a 1/scaler designed to divide said precoded scaled phase rotated signal by a function of the data rate of said modulator, resulting in a precoded phase rotated signal;
- a slicer for developing ideal reference signals;
- a precoder reconstruction filter for removing a modulus operation from said precoded phase rotated signal resulting in a phase rotated signal;
- a phase decoder designed to develop a derotation vector;
- a rotator designed to derotate said phase rotated signal to recover mapped N−2 msb's; and
- a slicer designed to recover said mapped N−2 msb's from said multidimensional signal space constellation.

23. A method for communication in a modem using uncoded modulation and circular constellations, comprising the steps of:

supplying an N-bit word to a register, said register configured to supply N–2 msb's and 2 lsb's;

mapping said N–2 msb's into a signal space constellation, resulting in mapped N–2 msb's;

phase encoding said 2 lsb's to develop a rotation vector;

rotating, in a rotator said mapped N–2 msb's with said rotation vector, said rotator designed to supply a phase rotated signal;

precoding said phase rotated signal;

scaling said precoded phase rotated signal in a scaler, said scaler designed to multiply said phase rotated signal by a function of the data rate, resulting in a precoded scaled phase rotated signal;

encoding said precoded scaled phase rotated signal in a nonlinear encoder;

modulating said precoded scaled phase rotated signal;

transmitting said modulated precoded scaled phase rotated signal over a communication channel;

receiving said transmitted precoded scaled phase rotated signal;

demodulating said received precoded scaled phase rotated signal;

equalizing said demodulated precoded scaled phase rotated signal;

decoding said equalized signal in a nonlinear decoder;

supplying said nonlinear decoded demodulated precoded scaled phase rotated signal to a noise whitening filter, said noise whitening filter designed to remove said preceding;

supplying said nonlinear decoded demodulated precoded scaled phase rotated signal to a 1/scaler, said 1/scaler configured to divide said precoded scaled phase rotated signal by a function of the data rate of said modulator, resulting in a normalized precoded phase rotated signal;

slicing said normalized precoded phase rotated signal;

supplying said normalized precoded phase rotated signal to a precoder reconstruction filter, said filter designed to remove said preceding from said normalized precoded phase rotated signal resulting in said phase rotated signal;

phase decoding said phase rotated signal in order to develop a derotation vector;

rotating said phase rotated signal to recover said mapped N–2 msb's; and slicing said phase rotated signal in order to recover said mapped N–2 misb's.

24. The method of claim 23, wherein said modulation comprises carrierless amplitude/phase (CAP) modulation.

25. The method of claim 23, wherein said modulation comprises uncoded quadrature amplitude modulation (QAM).

26. The method of claim 23, wherein said modulation comprises uncoded pulse amplitude modulation (PAM).

27. The method of claim 23, wherein said nonlinear encoder is a unity operator, passing said signal points unchanged.

28. The method of claim 23, wherein said step of precoding further comprises the steps of:

processing said phase rotated signal in a finite impulse response (FIR) filter;

processing said phase rotated signal with a modulo operation; and subtracting said modulo operated signal from said phase rotated signal.

29. The method of claim 28, wherein said FIR filter and said modulo operation reside in a feedback loop.

30. A method for transmitting in a modem using uncoded modulation and circular constellations, comprising the steps of:

supplying an N-bit word to a register, said register configured to supply N–2 msb's and 2 lsb's;

mapping said N–2 msb's into a signal space constellation, resulting in mapped N–2 msb's;

phase encoding said 2 lsb's to develop a rotation vector;

rotating, in a rotator, said mapped N–2 msb's with said rotation vector, said rotator designed to supply a phase rotated signal;

precoding said phase rotated signal;

scaling said precoded phase rotated signal in a scaler, said scaler designed to multiply said phase rotated signal by a function of the data rate, resulting in a precoded scaled phase rotated signal;

encoding said precoded scaled phase rotated signal in a nonlinear encoder;

modulating said precoded scaled phase rotated signal; and transmitting said modulated precoded scaled phase rotated signal over a communication channel.

31. The method of claim 30, wherein said modulation comprises carrierless amplitude/phase (CAP) modulation.

32. The method of claim 30, wherein said modulation comprises uncoded quadrature amplitude modulation (QAM).

33. The method of claim 30, wherein said modulation comprises uncoded pulse amplitude modulation (PAM).

34. The method of claim 30, wherein said step of precoding further comprises the steps of:

processing said phase rotated signal in a finite impulse response (FIR) filter;

processing said phase rotated signal with a modulo operation; and subtracting said modulo operated signal from said phase rotated signal.

35. The method of claim 34, wherein said FIR filter and said modulo operation reside in a feedback loop.

36. The method of claim 30, wherein said nonlinear encoder is a unity operator, passing said signal points unchanged.

37. A method for receiving in a modem using uncoded modulation and circular constellations, comprising the steps of:

receiving a transmitted precoded scaled phase rotated signal;

demodulating said received precoded scaled phase rotated signal;

equalizing said demodulated precoded scaled phase rotated signal;

decoding said equalized signal in a nonlinear decoder;

supplying said nonlinear decoded demodulated precoded scaled phase rotated signal to a noise whitening filter, said noise whitening filter designed to remove said preceding;

supplying said nonlinear decoded demodulated precoded scaled phase rotated signal to a 1/scaler, said 1/scaler configured to divide said precoded scaled phase rotated signal by a function of the data rate of said modulator, resulting in a normalized precoded phase rotated signal;

slicing said normalized precoded phase rotated signal;

supplying said normalized precoded phase rotated signal to a precoder reconstruction filter, said filter designed to remove said preceding from said normalized precoded phase rotated signal resulting in a phase rotated signal;

phase decoding said phase rotated signal in order to develop a derotation vector;

rotating said phase rotated signal to recover mapped N–2 msb's; and slicing said phase rotated signal in order to recover said mapped N–2 msb's.

38. A computer readable medium having a program for communicating in a modem using uncoded modulation and circular constellations, the program comprising logic for executing the steps of:

supplying an N-bit word to a register, said register configured to supply N–2 msb's and 2 lsb's;

mapping said N–2 msb's into a signal space constellation, resulting in mapped N–2 msb's;

phase encoding said 2 additional bits to develop a rotation vector;

rotating, in a rotator, said mapped N–2 msb's with said rotation vector, said rotator designed to supply a phase rotated signal;

precoding said phase rotated signal;

scaling said precoded phase rotated signal in a scaler, said scaler designed to multiply said phase rotated signal by a function of the data rate, resulting in a precoded scaled phase rotated signal;

encoding said precoded scaled phase rotated signal in a nonlinear encoder;

modulating said precoded scaled phase rotated signal;

transmitting said modulated precoded scaled phase rotated signal over a communication channel;

receiving said transmitted precoded scaled phase rotated signal;

demodulating said received precoded scaled phase rotated signal;

equalizing said demodulated precoded scaled phase rotated signal;

decoding said equalized signal in a nonlinear decoder;

supplying said nonlinear decoded demodulated precoded scaled phase rotated signal to a noise whitening filter, said noise whitening filter designed to remove said precoding;

supplying said nonlinear decoded demodulated precoded scaled phase rotated signal to a 1/scaler, said 1/scaler configured to divide said precoded scaled phase rotated signal by a function of the data rate of said modulator, resulting in a normalized precoded phase rotated signal;

slicing said normalized precoded phase rotated signal;

supplying said normalized precoded phase rotated signal to a precoder reconstruction filter, said filter designed to remove said precoding from said normalized precoded phase rotated signal resulting in said phase rotated signal;

phase decoding said phase rotated signal in order to develop a derotation vector;

rotating said phase rotated signal to recover said mapped N–2 msb's; and slicing said phase rotated signal in order to recover said mapped N–2 msb's.

39. The program of claim 38, wherein said modulation comprises carrierless amplitude/phase (CAP) modulation.

40. The program of claim 38, wherein said modulation comprises uncoded quadrature amplitude modulation (QAM).

41. The program of claim 38, wherein said modulation comprises uncoded pulse amplitude modulation (PAM).

42. The program of claim 38, wherein said nonlinear encoder is a unity operator, passing said signal points unchanged.

43. The program of claim 38, wherein said step of preceding further comprises the steps of:

processing said phase rotated signal in a finite impulse response (FIR) filter;

processing said phase rotated signal with a modulo operation; and subtracting said modulo operated signal from said phase rotated signal.

44. The program of claim 43, wherein said FIR filter and said modulo operation reside in a feedback loop.

45. A computer readable medium having a program for transmitting in a modem using uncoded modulation and circular constellations, the program comprising logic for executing the steps of:

supplying an N-bit word to a register, said register configured to supply N–2 msb's and 2 lsb's;

mapping said N–2 msb's into a signal space constellation, resulting in mapped N–2 msb's;

phase encoding said 2 lsb's to develop a rotation vector;

rotating, in a rotator, said mapped N–2 msb's with said rotation vector, said rotator designed to supply a phase rotated signal;

precoding said phase rotated signal;

scaling said precoded phase rotated signal in a scaler, said scaler designed to multiply said phase rotated signal by a function of the data rate, resulting in a precoded scaled phase rotated signal;

encoding said precoded scaled phase rotated signal in a nonlinear encoder;

modulating said precoded scaled phase rotated signal; and transmitting said modulated precoded scaled phase rotated signal over a communication channel.

46. The program of claim 45, wherein said modulation comprises carrierless amplitude/phase (CAP) modulation.

47. The program of claim 45, wherein said modulation comprises uncoded quadrature amplitude modulation (QAM).

48. The program of claim 45, wherein said modulation comprises uncoded pulse amplitude modulation (PAM).

49. The program of claim 45, wherein said step of precoding further comprises the steps of:

processing said phase rotated signal in a finite impulse response (FIR) filter;

processing said phase rotated signal with a modulo operation; and subtracting said modulo operated signal from said phase rotated signal.

50. The program of claim 49, wherein said FIR filter and said modulo operation reside in a feedback loop.

51. The program of claim 45, wherein said nonlinear encoder is a unity operator, passing said signal points unchanged.

52. A computer readable medium having a program for receiving in a modem using uncoded modulation and circular constellations, the program comprising logic for executing the steps of:

receiving a transmitted precoded scaled phase rotated signal;

demodulating said received precoded scaled phase rotated signal;

equalizing said demodulated precoded scaled phase rotated signal;

decoding said equalized signal in a nonlinear decoder;

supplying said nonlinear decoded demodulated precoded scaled phase rotated signal to a noise whitening filter, said noise whitening filter designed to remove said precoding;

supplying said nonlinear decoded demodulated precoded scaled phase rotated signal to a 1/scaler, said 1/scaler configured to divide said precoded scaled phase rotated signal by a function of the data rate of said modulator, resulting in a normalized precoded phase rotated signal;

slicing said normalized precoded phase rotated signal;

supplying said normalized precoded phase rotated signal to a precoder reconstruction filter, said filter designed to remove said precoding from said normalized precoded phase rotated signal resulting in a phase rotated signal;

phase decoding said phase rotated signal in order to develop a derotation vector;

rotating said phase rotated signal to recover mapped N−2 msb's; and slicing said phase rotated signal in order to recover said mapped N−2 msb's.

* * * * *

UNITED STATES PATENT AND TRADEMARK OFFICE
CERTIFICATE OF CORRECTION

PATENT NO. : 6,101,223  
DATED : August 8, 2000  
INVENTOR(S) : Betts

It is certified that error appears in the above-indentified patent and that said Letters Patent is hereby corrected as shown below:

Column 2, line 26, delete "preceding" and substitute therefore -- precoding --.

Column 3, line 4, delete "preceding" and substitute therefore -- precoding --.

Column 3, line 56, delete "preceding" and substitute therefore -- precoding --.

Column 5, line 65, delete "preceding" and substitute therefore -- precoding --.

Column 10, line 59, delete "preceding" and substitute therefore -- precoding --.

Column 11, line 38, delete "preceding" and substitute therefore -- precoding --.

Column 11, line 63, delete "preceding" and substitute therefore -- precoding --.

UNITED STATES PATENT AND TRADEMARK OFFICE
CERTIFICATE OF CORRECTION

PATENT NO. : 6,101,223
DATED : August 8, 2000
INVENTOR(S) : Betts

It is certified that error appears in the above-indentified patent and that said Letters Patent is hereby corrected as shown below:

Column 13, line 9, after "rotator" insert -- , --.

Column 13, line 32, delete "preceding" and substitute therefore -- precoding --.

Column 13, line 41, delete "preceding" and substitute therefore -- precoding --.

Column 14, line 61, delete "preceding" and substitute therefore -- precoding --.

Column 16, line 12, delete "preceding" and substitute therefore -- precoding --.

Signed and Sealed this

Tenth Day of April, 2001

NICHOLAS P. GODICI

*Attest:*

*Attesting Officer*              Acting Director of the United States Patent and Trademark Office